(12) United States Patent
Burleson et al.

(10) Patent No.: US 9,189,202 B2
(45) Date of Patent: Nov. 17, 2015

(54) GENERATE RANDOM NUMBERS USING METASTABILITY RESOLUTION TIME

(71) Applicant: The University of Massachusetts, Boston, MA (US)

(72) Inventors: Wayne P. Burleson, Shutesbury, MA (US); Vikram Belur Suresh, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 186 days.

(21) Appl. No.: 14/139,020

(22) Filed: Dec. 23, 2013

(65) Prior Publication Data

US 2015/0178048 A1      Jun. 25, 2015

(51) Int. Cl.
*G06F 7/58* (2006.01)

(52) U.S. Cl.
CPC ...................................... *G06F 7/588* (2013.01)

(58) Field of Classification Search
None
See application file for complete search history.

(56) References Cited

U.S. PATENT DOCUMENTS

| | | | |
|---|---|---|---|
| 6,771,104 B2 * | 8/2004 | Hars | H03K 3/84 327/164 |
| 6,829,628 B2 * | 12/2004 | Kim | G06F 7/588 708/254 |
| 7,124,155 B2 | 10/2006 | Hars | |
| 7,424,500 B2 | 9/2008 | Fukushima et al. | |
| 8,260,835 B2 | 9/2012 | Fukushima et al. | |
| 8,346,832 B2 | 1/2013 | Mudge et al. | |
| 8,489,660 B2 | 7/2013 | Herbert et al. | |
| 2008/0091755 A1 * | 4/2008 | Mudge | H04L 9/0866 708/250 |
| 2011/0302232 A1 * | 12/2011 | Vasyltsov | G06F 7/588 708/251 |

FOREIGN PATENT DOCUMENTS

EP        0365930 A2     5/1990

OTHER PUBLICATIONS

D.J. Kinnimet and E. Chester, "Design of an On-Chip Random Number Generator Using Metastability," Proc. 28th European Solid-State Circuits Conf., pp. 595-598, 2002.*
A. Bayrak et al., "An Architecture-Independent Instruction Shuffler to Protect Against Side-Channel Attacks," ACM Trans. Architec Code Optim. 8, 4, Article 20 (Jan. 2012), 19 pages.
M. Ko, et al., "Wireless Physical-Layer Security Performance of UWB Systems," The 2010 Military Communications Conference—Unclassified Program—Waveforms and Signal Processing Track, 6 pages.

(Continued)

*Primary Examiner* — Chuong D Ngo
*Assistant Examiner* — Matthew Sandifer
(74) *Attorney, Agent, or Firm* — Cantor Colburn LLP (57) ABSTRACT

A mechanism is provided for a circuit for generation of a random output. A bistable circuit has two stable states as an output and a clock signal as an input. The bistable circuit includes a first logic circuit and a second logic circuit cross-coupled connected together, which transition into a metastable state before resolving to the two stable states. The second logic circuit resolves to a stable state at a resolution time. A digitization circuit is configured to generate random bits corresponding to a variance of the resolution time of the second logic circuit resolving from the metastable state to the stable state for cycles of the clock signal. The resolution time randomly varies according to noise. An actual value of the stable state is eliminated as factor in generating the random bits.

20 Claims, 10 Drawing Sheets

(56) References Cited

OTHER PUBLICATIONS

S. Mathew, et al., "2.4 Gbps, 7 mW All-Digital PVT-Variation Tolerant True Random Number Generator for 45 nm CMOS High-Performance Microprocessors," IEEE Journal of Solid-State Circuits, vol. 47, No. 11, Nov. 2012; pp. 2807-2821.

C. Tokunaga, et al., "True Random Number Generator With a Metastabilit-Based Quality Control," IEEE Journal of Solid-State Circuits, vol. 43, No. 1; Jan. 2008; 8 pages.

* cited by examiner

GENERATE RANDOM NUMBERS USING METASTABILITY RESOLUTION TIME

BACKGROUND OF THE INVENTION

Conventional systems in the field of information security recognize the need for random numbers, and in recent years, there is an increasing demand for high-performance random number generators generating true random numbers, natural random numbers that have uniformity (i.e., are identical in probability in value and frequency of appearance) and appear without ordinality, relevance with preceding and following numbers, or predictability. One such random number generator employs a random pulse obtained by utilizing radioactive rays, thermal noise, crystal oscillator fluctuations, and other similar natural phenomena. However, the generation of truly random numbers is not an easy task. Different methods have tried to use metastable events to generate a random output value. They all seem to be less than ideal and tend to manipulate the output to restore randomness if they perceive it not to be present, which in itself is a non-random process.

SUMMARY OF THE INVENTION

According to an embodiment, a circuit for generation of a random output is provided. The circuit includes a bistable circuit having two stable states as an output and a clock signal as an input. The bistable circuit includes a first logic circuit and a second logic circuit cross-coupled connected together. The first and second logic circuits transition into a metastable state before resolving to the two stable states. The second logic circuit resolves to a stable state at a resolution time. A digitization circuit is configured to generate random bits corresponding to a variance of the resolution time of the second logic circuit resolving from the metastable state to the stable state for cycles of the clock signal. The resolution time randomly varies according to noise. An actual value of the stable state is eliminated as a factor in generating the random bits.

According to an embodiment, a method for generation of a random output is provided. The method includes generating a stable state after transitioning from a metastable state in a bistable circuit, detecting a resolution time to resolve from the metastable state to the stable state, and generating random bits corresponding to a variance of the resolution time resolving from the metastable state to the stable state for cycles of a clock signal. The resolution time randomly varies according to noise. An actual value of the stable state is eliminated as a factor in generating the random bits.

According to an embodiment, a computer program product, tangibly embodied on a computer readable medium, for generation of a random output is provided. The computer program product include instructions that, when executed by a processor, cause the processor to perform operations. The operations include generating a stable state after transitioning from a metastable state in a bistable circuit, detecting a resolution time to resolve from the metastable state to the stable state, and generating random bits corresponding to a variance of the resolution time resolving from the metastable state to the stable state for cycles of a clock signal. The resolution time randomly varies according to noise. An actual value of the stable state is eliminated as a factor in generating the random bits.

DETAILED DESCRIPTION OF THE INVENTION

Embodiments provide a true random number generator (TRNG) based on resolution time of metastable circuits. An unconventional 1×-8× cross-coupled inverter based metacell is used to extract randomness from device thermal noise in the form of resolution time. The asymmetric circuit provides tolerance to process variation and eliminates the need for accurate symmetric physical layout design. A time difference amplifier is used to magnify the impact of thermal noise of metastability resolution. A time to digital converter followed by a parity circuit detects and digitizes the variation in resolution time. The random number generator circuit is robust across process-voltage-temperature (PVT) variations and requires no additional post processing for entropy extraction.

True random number generators are important components of secure hardware systems. TRNGs find application in cryptographic systems to generate random keys, seed other pseudo random number generators (PRNG), and secure communication protocols and software simulations. A conventional TRNG circuit harnesses randomness from physical phenomena to generate highly uncorrelated and statistically random bits. The source of randomness could be cosmic rays, stray electromagnetic field, and thermal noise in semiconductor devices or clock jitter. Digital and analog circuits are used to sample and digitize the random physical phenomenon. Analog circuits for random bit generation use noise amplifiers to magnify on-chip noise and analog-to-digital converters (ADC). A variant of ADC based TRNG circuits is chaos based TRNG circuits. One of the most commonly used circuit for randomness extraction is ring oscillator (RO) which sample and digitize on-chip jitter noise. Memory based TRNG circuits include sensing random power-up state of SRAM cells or sensing random telegraph noise (RTN) in contact resistive RAM. Analog TRNG circuits are not energy efficient and do not scale with voltage and technology. RO based TRNG circuits require multiple ring oscillators leading to increased area and power consumption. Further, ring oscillators sample jitter which is significantly affected by global power supply noise. This renders the TRNG circuit vulnerable to invasive attacks. Frequency injection and electromagnetic emanation are shown to be effective in locking frequencies of oscillators, thereby compromising randomness of TRNG output.

To counter these drawbacks, metastable circuits are proposed as energy efficient and secure RNG components. The resolution state of an ideal metastable circuit depends on the random thermal noise present in the circuit. However, metastable circuits relying on matched devices; both in device size and physical layout are significantly impacted by random variations during fabrication process. Random dopant fluctuation (RDF) introduces mismatch in threshold voltages. Lithography variations introduce gate width variation and differential loading due to interconnect line width variation. This creates a statistical imbalance in the probabilities of generating 1's and 0's in the RNG. Process variation also magnifies the impact of supply noise and on-chip temperature variations. This has necessitated adaptive circuit compensation techniques using charge dump or circuit calibration using additional matching transistors. Large volume manufacturers use additional post-processing with cryptographic algorithms like advanced encryption standards (AES). Adaptive circuit calibration techniques require constant monitoring of TRNG output and additional control logic. Constant calibration also increases correlation between bits and can provide an avenue for invasive attacks. Robust digital post-processing using algorithms like AES impose significant overhead in area and power. They also reduce the throughput and energy efficiency. Ubiquitous applications like radio frequency identification (RFID) and sensors impose extreme constraints on area and energy of cryptographic circuits. Growing popularity of mobile computing has increased the need for longer battery life (energy efficient circuits) and smaller on-chip thermal profile (ultra-low power circuits). Other applications like instruction shuffling for secure computing and secure ultra wide band communication require high bit rate entropy source. This has necessitated high speed and energy efficient hardware security.

Embodiments present a novel random number generation technique and circuit using resolution time of a metastable circuit. The proposed metastable circuit does not require a symmetric/balanced physical layout design. The metastable circuit is tolerant to variation in fabrication process and operating conditions. Also, the lightweight, ultra-low power design does not require additional post-processing to extract randomness.

Figure 1:
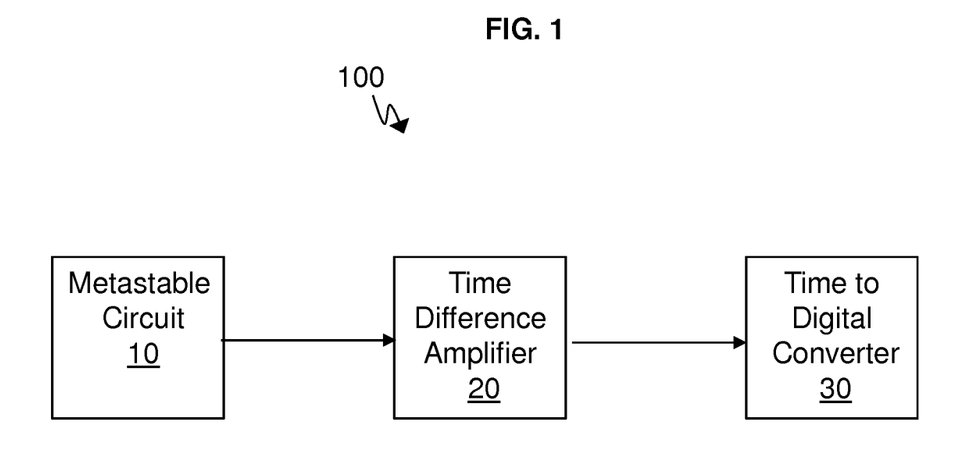
FIG. 1 illustrates a random number generator circuit which is a metastability resolution time based true random number generator (TRNG) according to an embodiment.

FIG. 1 illustrates a random number generator circuit 100 which is a metastability resolution time based true random number generator (TRNG) according to embodiments. The metastability resolution time based TRNG of circuit 100 has three major design blocks as shown in the example implementation. It is understood that fewer or more design blocks may be utilized.

The metastable circuit 10 (also referred to as a metacell) includes pre-charge based cross-coupled inverters to sample thermal noise. Since the standard deviation of resolution time can be as low as 0.8 ps (picoseconds) due to process variation in one example, a time difference amplifier 20 (TDA) is used to amplify the resolution time variation. A large enough amplification is achieved to practically capture the resolution time variation. A digitization circuit 30, using a time to digital converter (TDC) and a parity circuit, measures the resolution time and digitizes the resolution time to generate a single bit (random) output per cycle.

The random number generator circuit 100 generates a random bit stream of 0's and 1's which can then be utilized for cryptographic applications or other applications. As noted above, thermal noise is used as the physical source of randomness in the form of resolution time of the metastable circuit 10. Further details of the metastable circuit 10, the time difference amplifier 20, and the digitization circuit 30 are provided below.

Figure 2:
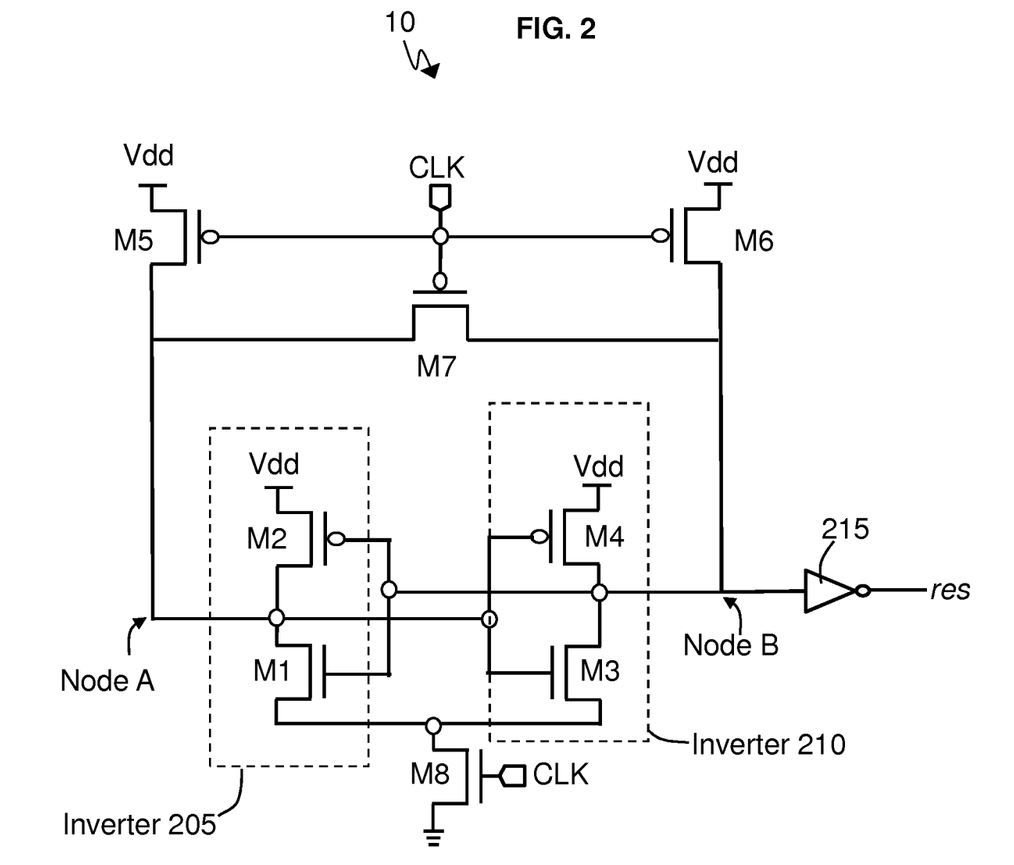
FIG. 2 illustrates a metastable circuit designed using a pair of cross-coupled inverters according to an embodiment.

FIG. 2 illustrates the metastable circuit 10 designed using a pair of cross-coupled inverters 205 and 210 formed by complementary metal oxide semiconductor (CMOS) transistors M1, M2, M3, and M4 according to an embodiment. The output nodes A and B are pre-charged using p-channel/p-type metal oxide semiconductor (PMOS) transistors M5 and M6. PMOS transistor M7 equalizes the pre-charge voltage, and n-type/n-channel metal oxide semiconductor (NMOS) transistor M8 forms the common sink path to ground for the cross-coupled inverters 205 and 210. The transistors M3 and M4 are sized 8× (8 times larger than) the size of M1 and M2. The asymmetric sizing ensures that the inverter 210 formed by M3 and M4 is always stronger (and faster) compared to the inverter 205 formed by M1 and M2, even in the presence of extreme fabrication process variation. As a result, the mean resolution time does not deviate significantly due to process variation and results in a simpler TDA design requirement. The output at node B is inverted by the NOT gate 215 to generate the resolution signal res, which is the resolution time of the inverter 210.

Figure 3:
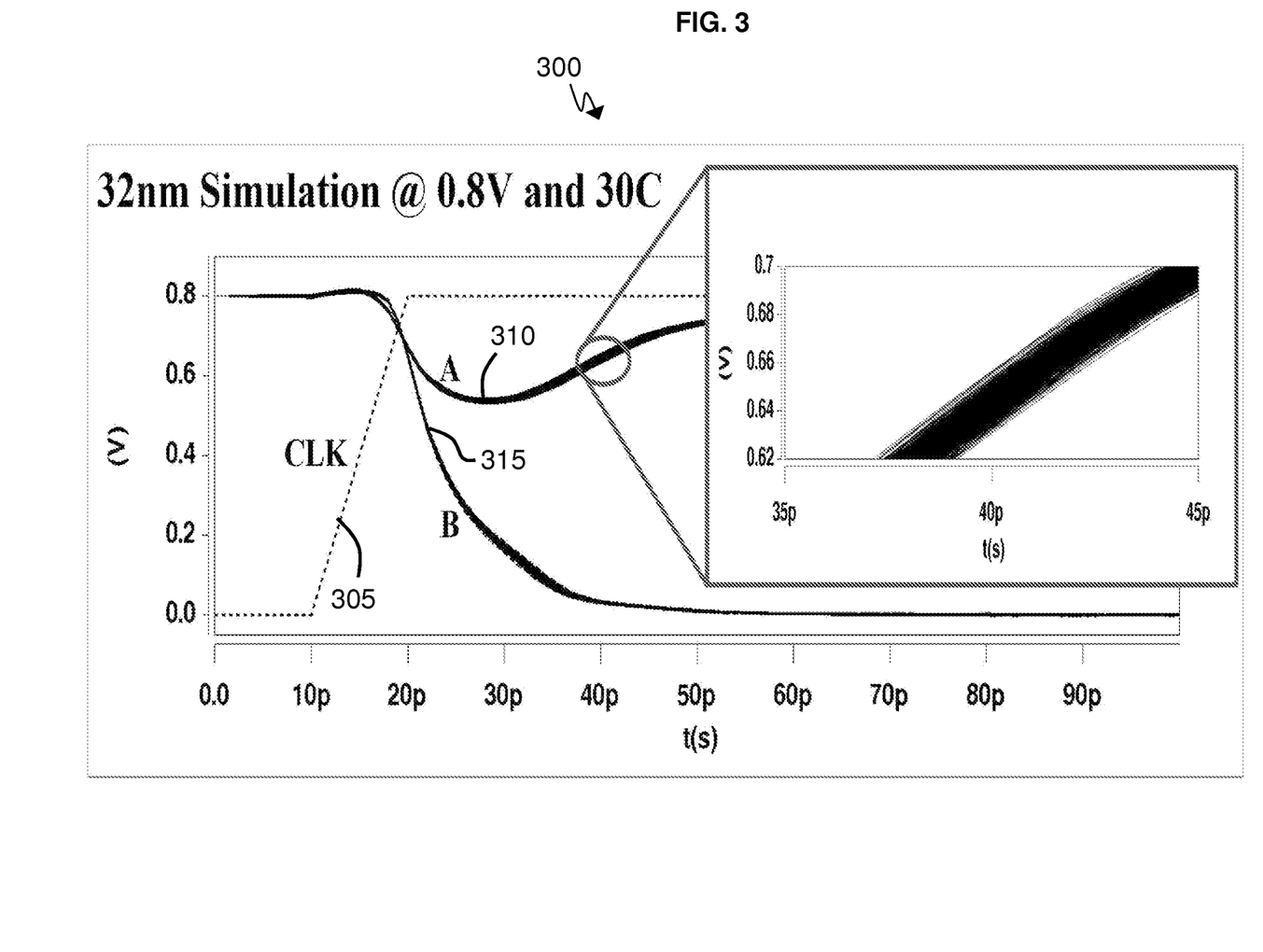
FIG. 3 is a graph that illustrates variation of resolution times in the metastable circuit due to thermal noise according to an embodiment.

During the negative half cycle of the clock signal (CLK), nodes A and B are pre-charged to supply voltage Vdd. As the CLK signal rises, the pre-charge is released and the state of nodes A and B enter a state of metastability. Since the transistors M3 and M4 of inverter 210 are a bigger size (in width) than transistors M1 and M2 in inverter 205, the node B is always pulled down to 0, enabling the res signal. Note that in one implementation the transistors for inverter 205 may be larger than the transistors for inverter 210. Depending on the thermal noise present in the circuit 100, the time for nodes A and B to resolve varies, as shown in FIG. 3. FIG. 3 is a graph 300 that illustrates variation of the resolution times for node A and node B (res) due to thermal noise for random number generator circuit 100 the according to embodiment. The graph 300 shows a line 305 of the clock signal (CLK), along with the line 310 of the output at node A and the line 315 of the output node B. FIG. 3 shows variation in the resolution time of the metastable circuit 10 across 1000 samples in simulation for 32 nm (nanometer) CMOS technology. Although the metastable circuit 10 always resolves to a deterministic state, the resolution time varies with differential thermal noise. The y-axis shows the voltage for the node A and B output versus the time (picoseconds) shown on the x-axis it takes for each node A and B to resolve to a stable state before the next rise in the clock signal.

Nodes A and B eventually resolve to ~0.8 V (high) and ~0.0 V (low), respectively, starting from the rise of the clock signal line 305 because of thermal noise. The time that each node takes to resolve is the node's resolution time. Although the resolution time of node B (which is res) is utilized to eventually generate the random bit stream, in other implementations, the resolution time of node A may be analogously utilized. In one implementation, the difference between the resolution times of nodes A and B may be utilized. Additionally, the resolution times of both nodes A and B may be alternatingly used as the input to the time difference amplifier 20.

The variation in the resolution time of node is a function of thermal noise which is the source of randomness. If there were no thermal noise, the resolution time of the metacell (metastable circuit 10) for node A goes to logic 1 (0.8V) and node B to goes to logic (0V), and metacell would always be constant. The sizing of the inverter 210 is larger than the inverter 205 in order to ensure that the mean value of metastability resolution time remains nearly constant across 3 standard deviations of metastable circuit 10 device variation. However, the resolution has a Gaussian distribution with standard deviation 0.81 ps (picoseconds) across different cycles (of the clock signal CLK) due to variation in differential thermal noise at nodes A and B. So, for clock cycle 1 of the clock signal CLK, the resolution time for node B of the inverter 210 is a first (random) resolution time. Next, for clock cycle 2, the resolution time for node B of the inverter 210 is a second (random) resolution time. Then, for clock cycle 3, the resolution time for node B of the inverter 210 is a third (random) resolution time. Accordingly, for clock cycle N of the clock signal CLK, the resolution time for node B of inverter 210 is N (random) resolution time, where N represents the last clock cycle and accordingly the last resolution time measured from node B. The first through last (N) resolution times per cycle for node B are statistically random. The clock signal (CLK) is a particular type of signal that oscillates between a high state (e.g., positive half cycle) and a low state (e.g., negative or zero half cycle). The clock signal CLK is the global clock that runs for the random generator circuit 100. The clock signal may be a square wave with a 50% duty cycle. Since the resolution time is measured with reference to the positive edge of clock signal, a counter (not shown) which is started by the clock signal and stopped by the res signal can be used to measure the resolution time. However, since the variation in resolution time due to thermal noise is of the order of 0.8 picoseconds, it may be difficult to recognize a visible change in the counter value. Hence, the time difference amplifier 20 is utilized to amplify the magnitude in variation of the resolution time such that the variation in the resolution time is large enough to be captured by a counter or the time to digital converter 30.

Figure 4:
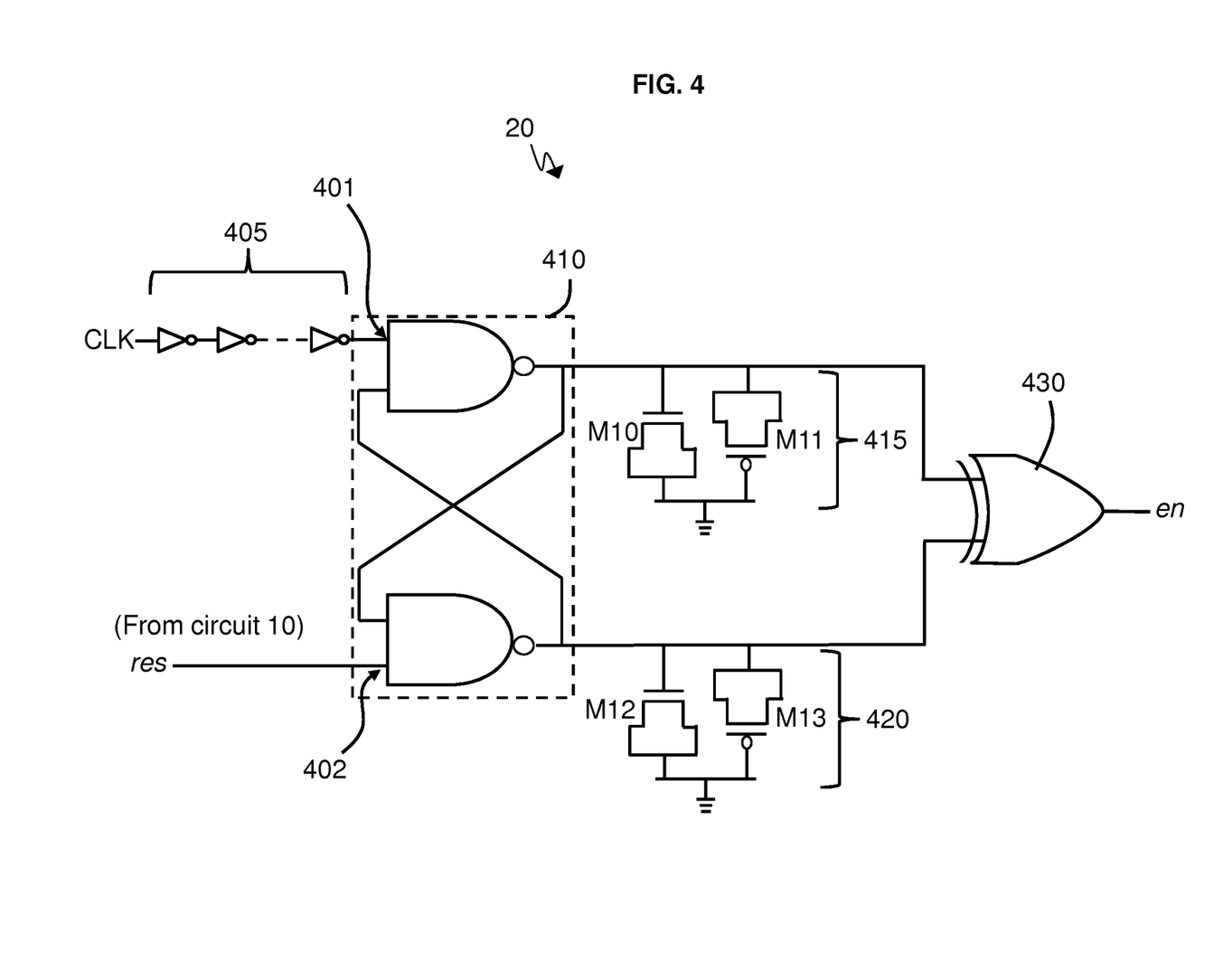
FIG. 4 illustrates a time difference amplifier that amplifies the difference in the resolution time with respect to the clock signal according to an embodiment.
Figure 5:
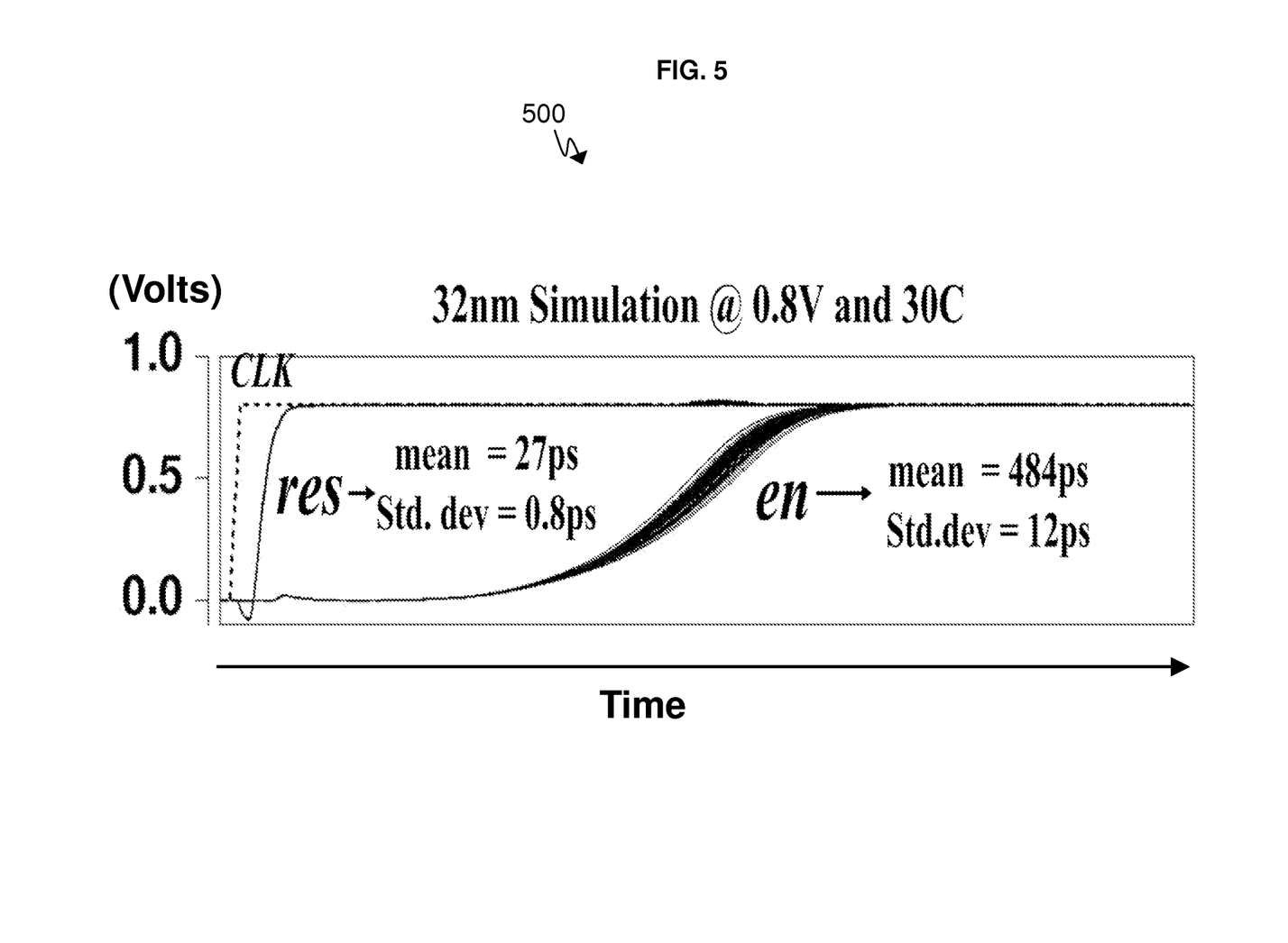
FIG. 5 is a graph illustrating the amplified delay between the clock signal and the resolution time according to an embodiment.

FIG. 4 illustrates the time difference amplifier 20 that amplifies the resolution time (res) with respect to the clock signal (CLK) according to an embodiment. The clock signal is delayed using a chain of inverters 405 and fed into one input 402 of a cross coupled NAND gate structure 410. The other input 402 of the cross coupled NAND gate structure 410 is connected to the resolution detection signal res. Large capacitive loads 415 and 420 at the NAND gate outputs of the cross coupled NAND gate structure 410 provide time amplification gain. The large capacitive loads 415 and 420 are big device with a width approximately 4 micrometers (μm) in one implementation. Accordingly, the large capacitive loads 415 and 420 take a long time to go to 0, and therefore, the time difference between the clock signal CLK and the resolution time res is increased. An XOR gate 430 connected to the two NAND gate outputs generates an amplified signal en (enable signal). The time difference amplifier 20 amplifies the time difference between CLK and res. Since delay of the time resolution signal res relative to the clock signal CLK has a standard deviation of 0.81 ps due to thermal noise, the delay of amplified signal en (enable signal) relative to the CLK has a standard deviation of approximately 12 ps, as illustrated in FIG. 5. FIG. 5 is a graph 500 illustrating the amplified delay between the clock signal (CLK) and the resolution time according to an embodiment. The graph 500 shows voltage on the y-axis and time (picoseconds) on the x-axis. The output of the time difference amplifier (TDA) 30 is a function of the time difference between the positive edge of the clock and positive edge of res signal from the metastable circuit 10. Depending on the capacitive load created using the large NMOS and PMOS devices 415 and 420, this time difference is amplified by a factor known as the amplification gain. Since the time difference between CLK and res signals has a standard deviation of 0.81 pico seconds, this variance also gets amplified by the TDA 30 to a Gaussian distribution of standard deviation approximately 12 picoseconds. This provides a reasonable variation in resolution time every cycle to digitize into a random bit. The impact of thermal noise, if any, in the TDA 30 only increases the randomness of the bit stream generated.

Figure 6:
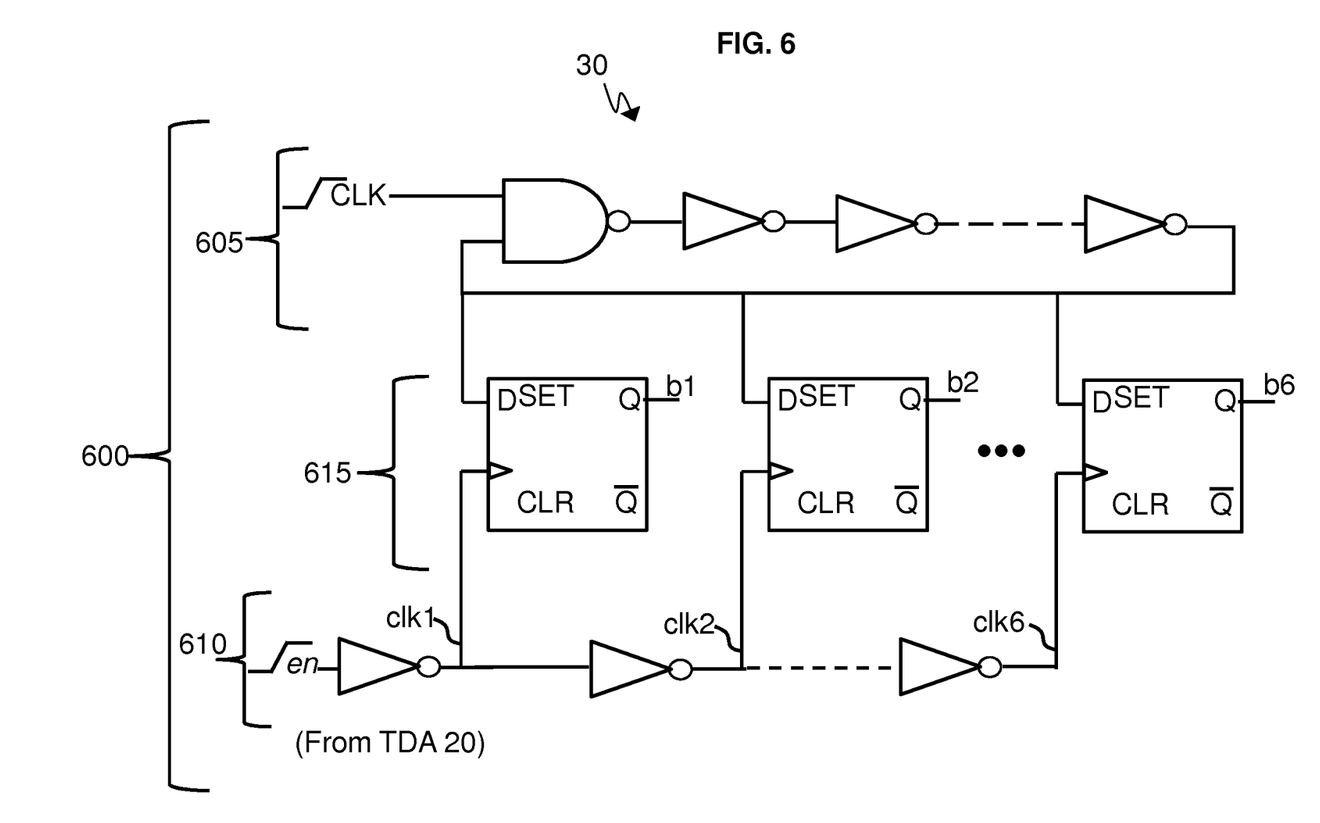
FIG. 6 illustrates a time to digital converter with a 7-stage ring oscillator circuit enabled by a delayed version of the clock signal according to an embodiment.
Figure 7:
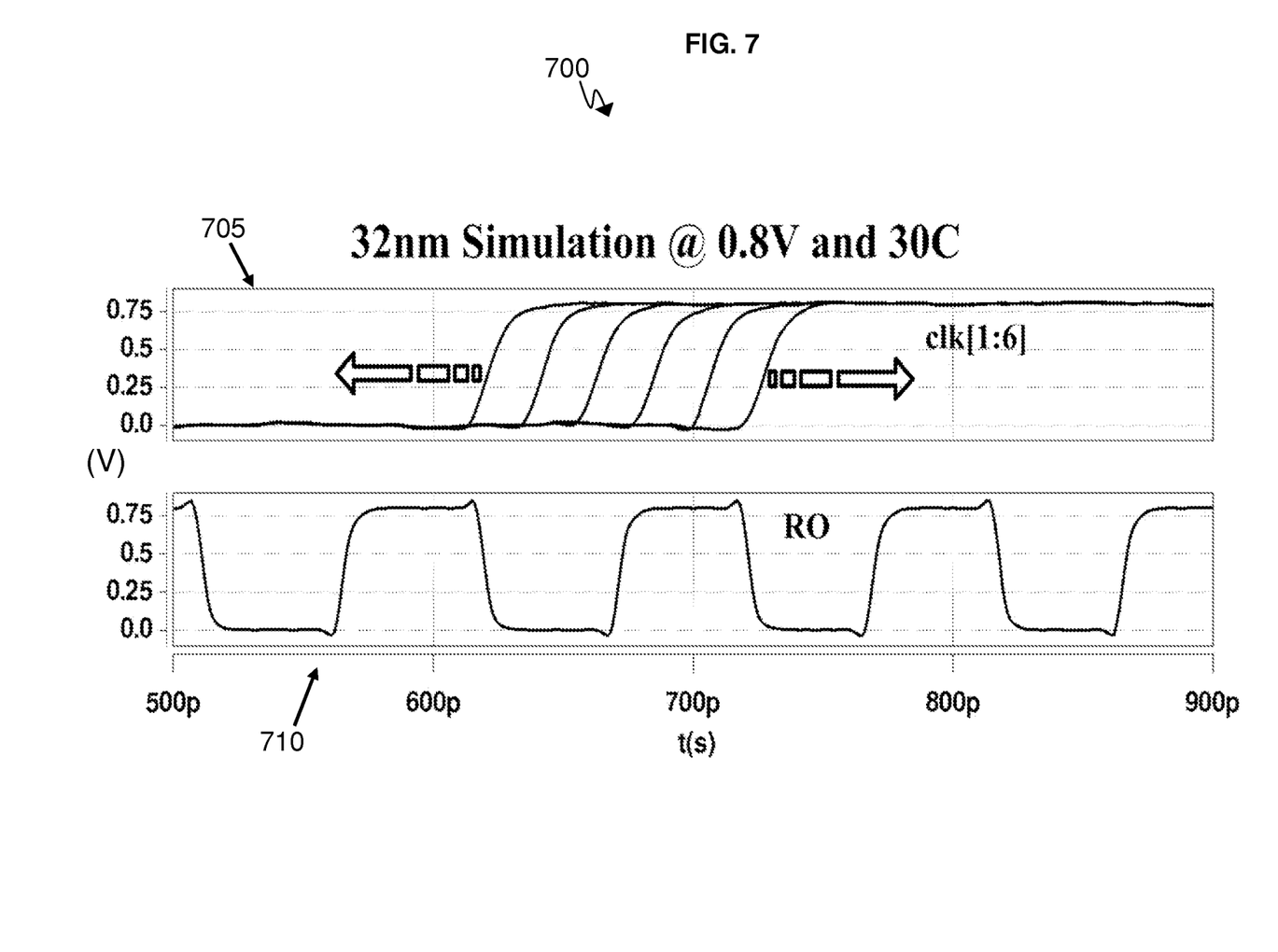
FIG. 7 is graph illustrating time varying internal clock signals utilized to sample a ring oscillator signal according to an embodiment.
Figure 8:
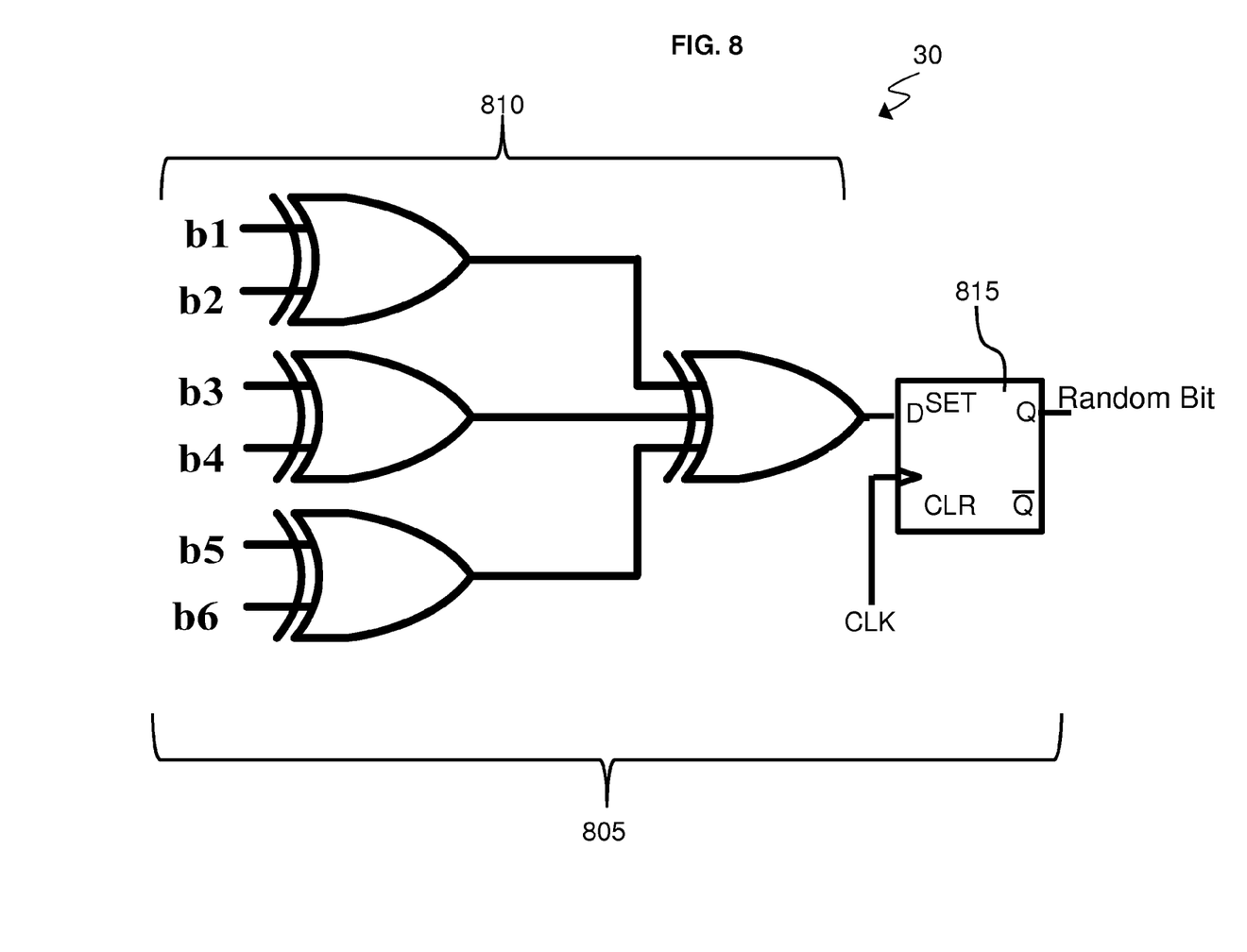
FIG. 8 illustrates a parity circuit that outputs random bits according to an embodiment.

Now turning to FIG. 6, the time to digital converter (TDC) 600 includes a 7-stage ring oscillator (RO) circuit 605 enabled by a delayed version of the CLK signal according to an embodiment. Note that the clock signal CLK is the global clock. The amplified resolution time signal en is passed through a 6-stage delay line 610 generating internal clock signals clk[1:6]. The internal clock signals clk[1:6] denote the internally generated clock signals clk1, clk2, clk3, through clk6, and the internal clock signals are different from the global clock signal CLK. There are 6 D flip flop circuits 615 with their respective D inputs individually tapped/connected to the ring oscillator circuit 605 and their respective clock inputs individually connected to respective internal clock signals clk[1:6]. The internal clock signals clk[1:6] cause the D flip flop circuits 615 to respectively latch the state of ring oscillator circuit 605 at each different internal clock signal time. Depending on the thermal noise in the metastable circuit 10, the resolution time signal res of node B varies. This variance in resolution time res from node B then varies the delay of the en signal relative to the global clock signal CLK in the time difference amplifier 20. This in turn, varies the delay amplified signal en with respect to the global clock signal CLK in the time to digitization circuit 30. The variation gets propagated to the internal clk[1:6] signals in the time to digitization circuit 30 that latches bits b[1:6], as shown in FIG. 7. The state latched in each of bits b[1] to b[6] is a function of thermal noise in the metastable circuit 10 and hence random. A parity circuit 805 using XOR gates 810 converts the 6 bits (bits b1 to b6) into one random bit, as shown in FIG. 8. FIG. 8 illustrates the parity circuit 805 which has XOR gates 810 connected to a D flip flop circuit 815 to output random bits according to embodiments. The digitization circuit 30 includes the time to digital converter 600 connected to the parity circuit 805.

FIG. 7 is a view 700 that illustrates the time varying internal clock signals clk[1:6] utilized by the D flip flop circuits 615 to sample the ring oscillator according to an embodiment. Graph 705 shows the 6 internal clock signals clk[1:6] respectively spaced by 12 ps. Graph 710 shows the ring oscillator signal of the ring oscillator circuit 605 aligned in time to the 6 internal clock signals. The x-axis shows time in picoseconds and the y-axis shows voltage. Each of the D flip flop circuits 615 latches a sample of the ring oscillator signal based on when the particular D flip flop circuit 615 receives its respective internal clock signal clk[1:6]. These 6 internal clock signals are randomly shifted back and forth (left and right) in time relative to the ring oscillator signal. This allows one or more of the 6 bits to be a random sample of the ring oscillator signal.

Note that implementations of the random generator circuit 100 are not limited to the exact configuration of circuits. It is understood that the configuration of the circuits discussed herein are for explanation purposes.

Figure 9:
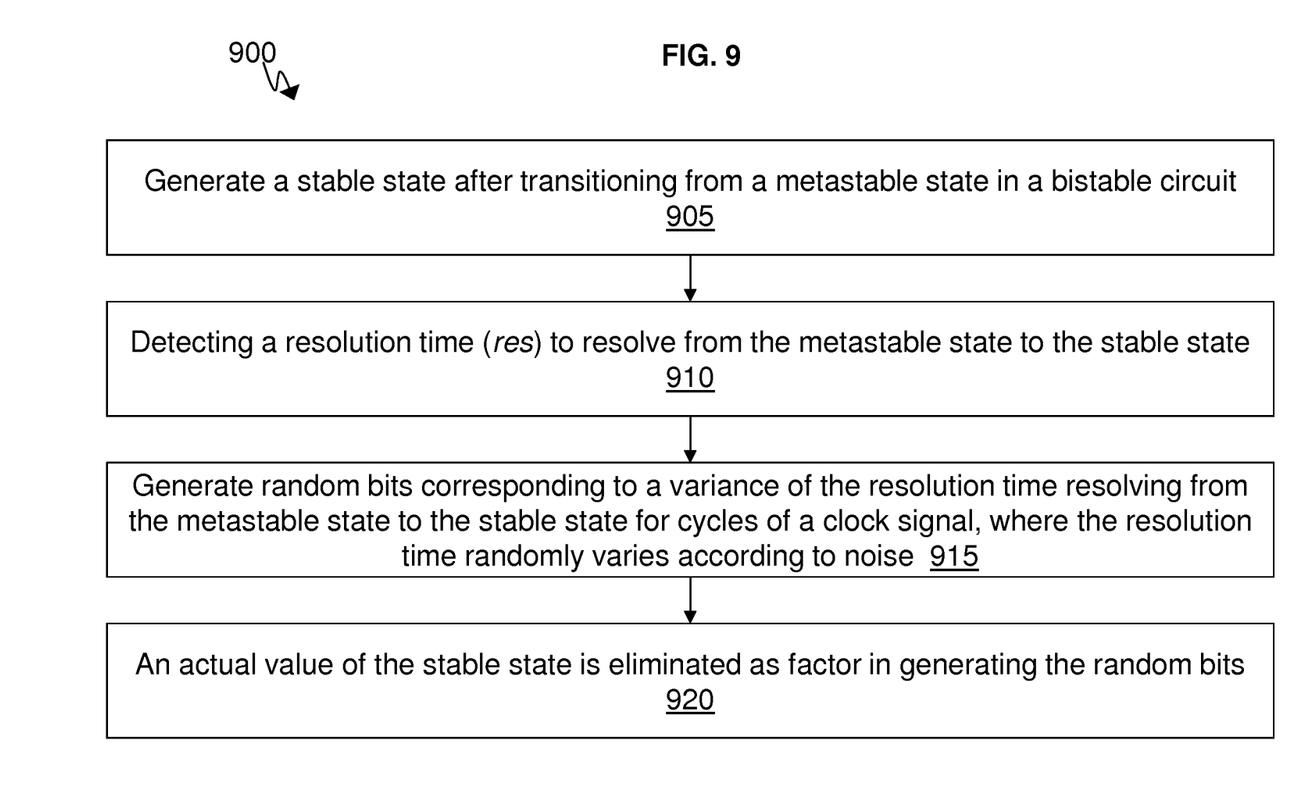
FIG. 9 is a flowchart illustrating a method for generation of a random bit output according to an embodiment.
Figure 10:
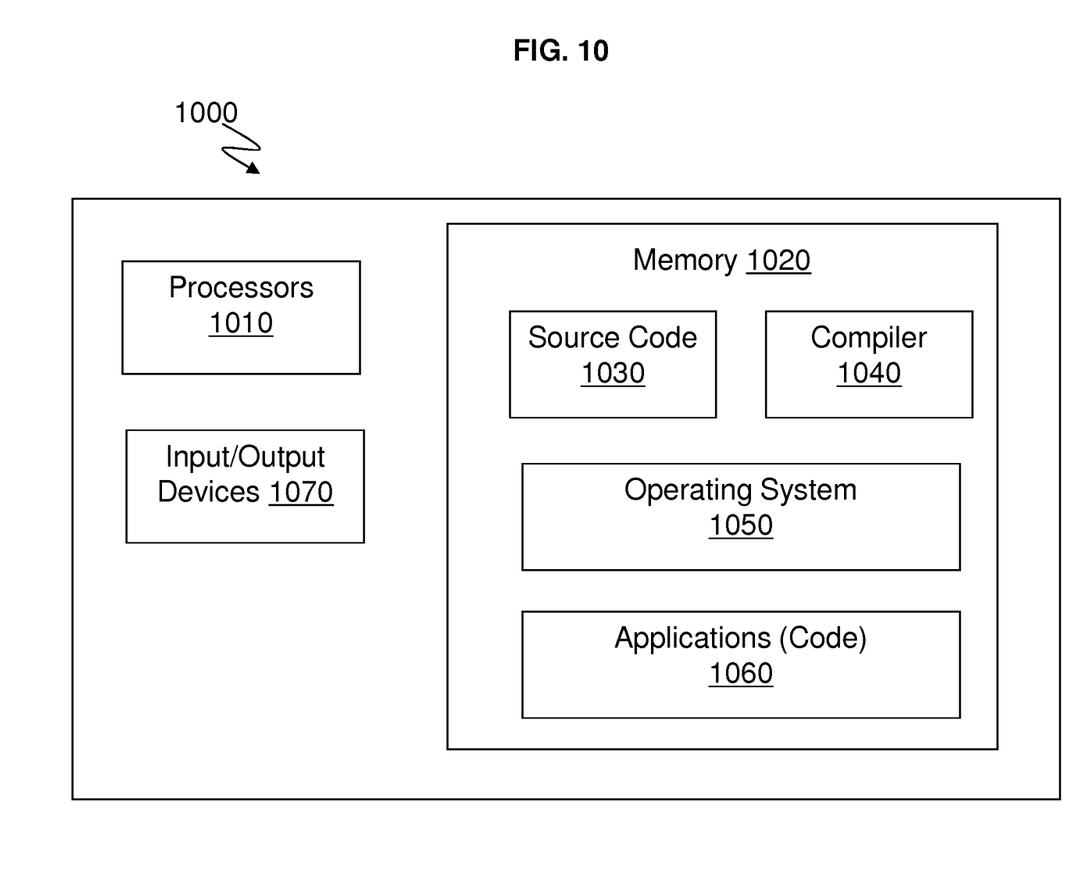
FIG. 10 illustrates an example of a computer which includes, operates, and/or is operatively connected to the random number generator circuit according to an embodiment.

FIG. 9 is a flowchart 900 illustrating a method for generation of a random output (i.e., random bits) according to an embodiment. Reference can be made to FIGS. 1-8, along with FIG. 10 discussed below. FIG. 10 is an example computer 100 that may include the circuits discussed herein and/or connect to the circuits discussed in order to execute/cause operations discussed herein.

At block 905, the metastable circuit 10 (i.e., bistable circuit) is configured to generate a stable state (for inverter 205 at node A and inverter 210 at node B) after transitioning from a metastable state in a bistable circuit.

At block 910, the time difference amplifier 20 is configured to detect a resolution time (i.e., the res signal from the NOT gate 215) to resolve from the metastable state to the stable state (for the inverter 210). The digitization circuit 30 receives the output signal en from the time difference amplifier 20.

At block 915, the digitization circuit 30 is configured to generate random bits corresponding to a variance of the resolution time resolving from the metastable state to the stable state for cycles of the global clock signal (CLK), where the resolution time randomly varies according to the thermal noise in the metastable circuit 10.

At block 920, the time difference amplifier 20 is configured such that an actual value (such as a 0 or 1) of the stable state is eliminated as factor in generating the random bits. The actual values (0 or 1) that node A and node B ultimately resolve to do not affect and factor into the calculation of the random bits generated by the digitization circuit 30.

The time difference amplifier circuit 20 is configured to amplify the resolution time (res) with respect to the clock signal (CLK) in order to output an enable signal (en). The time difference amplifier circuit 20 is configured to generate a time difference (e.g., FIG. 5) between the resolution time (res) and the clock signal (CLK).

The digitization circuit 30 (shown in FIG. 6) comprises the time to digital converter 600 configured to receive the enable signal (en) and the clock signal (CLK) as input in order to generate a plurality of bits (e.g., bit 1 through bit 6 (bits b[1:6])). The time to digital converter 600 comprises the ring oscillator circuit 605 connected to a plurality of latch circuits 615, and the plurality of latch circuits 615 are connected to the delay chain circuit 610. The delay chain circuit 610 generates different internal clock signals (clk 1 through clk 6) utilizing the enable signal (en), such that each of the plurality of latch circuits 615 respectively samples a signal of the ring oscillator circuit 605 in order to output the plurality of bits (e.g., bit 1 through bit 6) according to each one of the different internal clock signals (clk 1 through clk 6).

The digitization circuit 30 further comprises the parity circuit 805 configured to receive the plurality of bits (bits b1, b2, b3 . . . b6) as input, and the parity circuit 805 outputs a random bit per cycle of the clock signal (CLK) in order to generate the random bits.

The bistable circuit (i.e., metastable circuit 10) comprises a first logic circuit (e.g., inverter 205) and a second logic circuit (e.g., inverter 210) cross-coupled connected together, where the first and second logic circuits transition into the metastable state before resolving to two stable states (i.e., 0 or 1). The second logic circuit (i.e., inverter 210 with transistors M3 and M4) is larger in width than the first logic circuit (i.e., inverter 205 with transistors M1 and M2) such that the second logic circuit resolves to its stable state (e.g., logic 0 corresponding to 0 V shown in FIG. 3) at the resolution time faster than the first logic circuit resolves to its stable state (e.g., logic 1 corresponding to 0.8 V).

Now turning to FIG. 10, an example of a computer 1000 is illustrated which includes, operates, and/or is operatively connected to the random number generator circuit 100 according to an embodiment. The computer 1000 has capabilities that may be included in embodiments. The random number generator circuit 100 may be constructed on a processor 1010 and/or connected to the processor 1010 as understood by one skilled in the art (for operating as discussed herein). Various methods, procedures, circuits, elements, and techniques discussed herein may also incorporate and/or utilize the capabilities of the computer 1000. One or more of the capabilities (including voltage source Vdd) of the computer 1000 may be utilized to implement, to incorporate, to connect to, execute operations for, and/or to support any element discussed herein in FIGS. 1-9 (as understood by one skilled in the art).

Generally, in terms of hardware architecture, the computer 1000 may include one or more processors 1010, computer readable storage memory 1020, and one or more input and/or output (I/O) devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a data signal processor (DSP), or an auxiliary processor among several processors associated with the computer 1000, and the processor 1010 may be a semiconductor based microprocessor (in the form of a microchip) or a microprocessor.

The computer readable memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the computer readable memory 1020 may include one or more separate programs, each of which comprises an ordered listing of executable instructions for implementing logical functions. The software in the memory 1020 includes a suitable operating system (O/S) 1050, compiler 1040, source code 1030, and one or more applications 1060 of the exemplary embodiments. As illustrated, the application 1060 comprises numerous functional components for implementing the features, processes, methods, functions, and operations of the exemplary embodiments. The application 1060 of the computer 1000 may represent numerous applications, agents, software components, modules, interfaces, controllers, etc., as discussed herein but the application 1060 is not meant to be a limitation.

The operating system 1050 may control the execution of other computer programs, and provides scheduling, input-output control, file and data management, memory management, and communication control and related services.

The application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as (a) an object oriented programming language, which has classes of data and methods, or (b) a procedure programming language, which has routines, subroutines, and/or functions.

The I/O devices 1070 may include input devices (or peripherals) such as, for example but not limited to, a mouse, keyboard, scanner, microphone, camera, etc. Furthermore, the I/O devices 1070 may also include output devices (or peripherals), for example but not limited to, a printer, display, etc. Finally, the I/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 1010 utilizing Bluetooth connections and cables (via, e.g., Universal Serial Bus (USB) ports, serial ports, parallel ports, FireWire, HDMI (High-Definition Multimedia Interface), etc.).

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

When the application 1060 is implemented in software it should be noted that the application 1060 can be stored on virtually any computer readable storage medium for use by or in connection with any computer related system or method.

The application 1060 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 1060 is implemented in hardware, the application 1060 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A circuit for generation of a random output, the circuit comprising:
   a bistable circuit having two stable states as an output and a clock signal as an input, the bistable circuit comprising a first logic circuit and a second logic circuit cross-coupled connected together, the first and second logic circuits transitioning into a metastable state before resolving to the two stable states;
   the second logic circuit resolves to a stable state at a resolution time; and
   a digitization circuit configured to generate random bits corresponding to a variance of the resolution time of the second logic circuit resolving from the metastable state to the stable state for cycles of the clock signal, the resolution time randomly varying according to noise;
   wherein an actual value of the stable state is eliminated as a factor in generating the random bits.

2. The circuit of claim 1, further comprising a time difference amplifier circuit configured to amplify the resolution time with respect to the clock signal in order to output an enable signal.

3. The circuit of claim 2, wherein the time difference amplifier circuit is configured to generate a time difference between the resolution time and the clock signal.

4. The circuit of claim 2, wherein the digitization circuit comprises a time to digital converter configured to receive the enable signal and the clock signal as input in order to generate a plurality of bits.

5. The circuit of claim 4, wherein the time to digital converter comprises a ring oscillator circuit connected to a plurality of latch circuits, the plurality of latch circuits being connected to a delay chain circuit;
   wherein the delay chain circuit generates different internal clock signals utilizing the enable signal, such that each of the plurality of latch circuits respectively samples a signal of the ring oscillator circuit in order to output the plurality of bits according to the different internal clock signals.

6. The circuit of claim 4, wherein the digitization circuit further comprises a parity circuit configured to receive the plurality of bits as input;
   wherein the parity circuit outputs a random bit per cycle of the clock signal in order to generate the random bits.

7. The circuit of claim 1, wherein the second logic circuit is larger in width than the first logic circuit.

8. A method for generation of a random output, the method comprising:
   generating a stable state after transitioning from a metastable state in a bistable circuit;
   detecting a resolution time to resolve from the metastable state to the stable state; and
   generating random bits corresponding to a variance of the resolution time resolving from the metastable state to the stable state for cycles of a clock signal, the resolution time randomly varying according to noise;

wherein an actual value of the stable state is eliminated as a factor in generating the random bits.

9. The method of claim 8, wherein a time difference amplifier circuit is configured to amplify the resolution time with respect to the clock signal in order to output an enable signal.

10. The method of claim 9, wherein the time difference amplifier circuit is configured to generate a time difference between the resolution time and the clock signal.

11. The method of claim 9, wherein a digitization circuit comprises a time to digital converter configured to receive the enable signal and the clock signal as input in order to generate a plurality of bits.

12. The method of claim 11, wherein the time to digital converter comprises a ring oscillator circuit connected to a plurality of latch circuits, the plurality of latch circuits being connected to a delay chain circuit;

wherein the delay chain circuit generates different internal clock signals utilizing the enable signal, such that each of the plurality of latch circuits respectively samples a signal of the ring oscillator circuit in order to output the plurality of bits according to the different internal clock signals.

13. The method of claim 11, wherein the digitization circuit further comprises a parity circuit configured to receive the plurality of bits as input;

wherein the parity circuit outputs a random bit per cycle of the clock signal in order to generate the random bits.

14. The method of claim 8, wherein the bistable circuit comprises a first logic circuit and a second logic circuit cross-coupled connected together, the first and second logic circuits transitioning into the metastable state before resolving to two stable states; and wherein the second logic circuit is larger in width than the first logic circuit.

15. A computer program product, tangibly embodied on a non-transitory computer readable medium, for generation of a random output, the computer program product including instructions that, when executed by a processor, cause the processor to perform operations comprising:

generating a stable state after transitioning from a metastable state in a bistable circuit;

detecting a resolution time to resolve from the metastable state to the stable state; and generating random bits corresponding to a variance of the resolution time resolving from the metastable state to the stable state for cycles of a clock signal, the resolution time randomly varying according to noise;

wherein an actual value of the stable state is eliminated as a factor in generating the random bits.

16. The computer program product of claim 15, further comprising amplifying the resolution time with respect to the clock signal in order to output an enable signal.

17. The computer program product of claim 16, further comprising generating a time difference between the resolution time and the clock signal.

18. The computer program product of claim 16, further comprising generating a plurality of bits by receiving input of the enable signal and the clock signal.

19. The computer program product of claim 18, further comprising generating different internal clock signals utilizing the enable signal; and respectively sampling a signal of a ring oscillator circuit in order to output the plurality of bits according to the different internal clock signals.

20. The computer program product of claim 18, further comprising inputting the plurality of bits into a parity circuit that outputs a random bit per cycle of the clock signal in order to generate the random bits.

* * * * *